July 8, 1969  R. WICK ET AL  3,454,755
FLASH UNIT FOR PHOTOGRAPHIC CAMERAS
Filed July 12, 1966

INVENTOR.
RICHARD WICK
KARL WAGNER
BY JOACHIM v. ALBEDYLL
OTFRIED RENNER

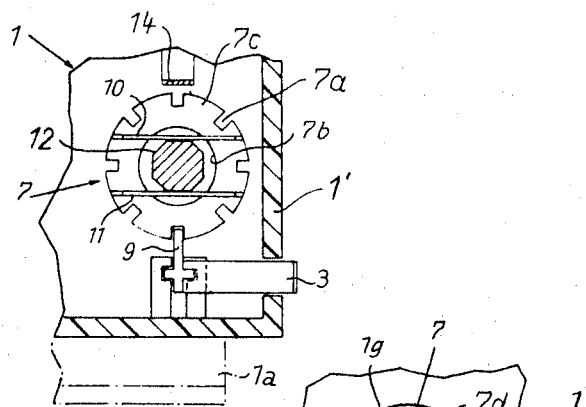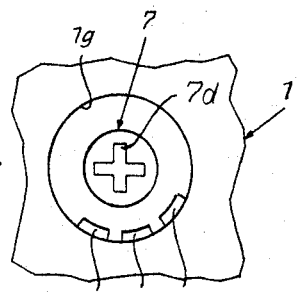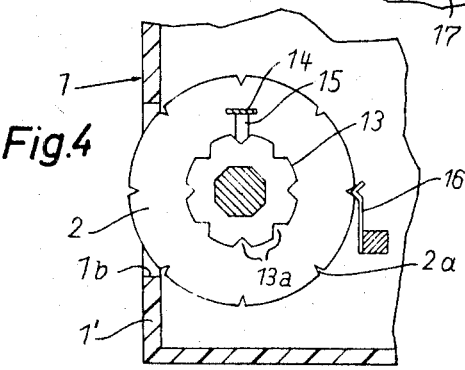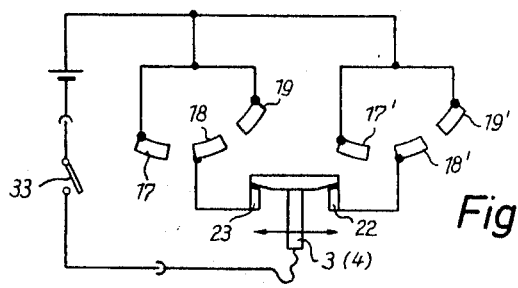
INVENTOR.
RICHARD WICK
KARL WAGNER
JOACHIM v. ALBEDYLL
OTFRIED RENNER United States Patent Office 3,454,755
Patented July 8, 1969

3,454,755
FLASH UNIT FOR PHOTOGRAPHIC CAMERAS
Richard Wick, Grunwald, Karl Wagner, Ottobrunn, Munich, Joachim von Albedyll, Munich, and Otfried Renner, Unterhaching, Germany, assignors to Agfa Gevaert Aktiengesellschaft, Leverkusen, Germany
Filed July 12, 1966, Ser. No. 564,632
Claims priority, application Germany, July 26, 1965, A 49,848
Int. Cl. G03b 15/02, 9/70
U.S. Cl. 240—1.3                17 Claims

ABSTRACT OF THE DISCLOSURE

A flash unit for use with photographic cameras has a housing at least one lateral panel of which supports a socket rotatable about a horizontal axis which is normal to the optical axis of the camera objective and adapted to carry and to rotate a multiple flash bulb container. The socket is indexible between several angular positions whose number exceeds the number of flash bulbs in a container. The flash circuit comprises a battery and contacts disposed in the housing in such a way that a flash bulb can be fired in several neighboring angular positions of the socket to thus effect direct or indirect illumination of a subject or scene.

The present invention relates to flash units for photographic cameras. More particularly, the invention relates to improvements in flash units of the type disclosed, for example, in the copending application Ser. No. 550,805 of Wick et al. Still more particularly, the invention relates to improvements in flash units which utilize so-called "Flashcubes" or analogous multiple flash bulb containers.

The aforementioned copending applications of Wick et al. disclose a photographic camera which is provided with an accessory shoe so that it can receive the foot of a housing forming part of a flash unit which can accommodate a multiple flash bulb container. The container may be rotated by means of a drive which is installed in the housing of the flash unit or by means of a drive which is installed in or mounted on the camera proper.

A serious drawback of presently known flash units which operate with so-called "Flashcubes" or analogous multiple flash bulb containers is that the operator must remove a spent container after having made a relatively small number of exposures in artificial light. For example, a "Flashcube" comprises four flash bulbs and, therefore, it must be removed and replaced by a fresh "Flashcube" after each fourth exposure with flash. This consumes much time and, furthermore, it happens quite frequently that the operator must replace a spent multiple flash bulb container at the very moment when he could have made a unique exposure such as is not likely to be possible thereafter.

Accordingly, it is an important object of the present invention to provide a novel and improved flash unit which can be used in connection with presently available multiple flash bulb containers but which is constructed and assembled in such a way that it can furnish artificial light for a series of exposures whose total number exceeds the number of flash bulbs in a single container.

Another object of the invention is to provide a flash unit of the just outlined characteristics which can be used with presently known cameras.

A further object of the invention is to provide a flash unit which can furnish more artificial light than is furnished by a single flash bulb.

An additional object of the invention is to provide a flash unit which can insure full or partial artificial illumination of a subject and wherein the desired angle at which the artificial light impinges upon a subject can be selected with utmost accuracy and in a very simple and time-saving manner.

A concomitant object of our invention is to provide a flash unit which can remain attached to a photographic camera when the user wishes to make exposures in daylight or in artificial light other than that furnished by the light bulbs carried by the flash unit.

Still another object of the present invention is to provide a flash unit which is constructed and assembled with a view to enable the user to select the intensity of artificial illumination and which enables the user to leave a spent multiple flash bulb container on the camera while the camera is still in a condition to take further pictures in artificial light.

Another object of the invention is to proivde a very simple indexing arrangement for the multiple flash units which are carried by its housing.

Briefly stated, one feature of our invention resides in the provision of a flash unit for use on photographic cameras of the type preferably comprising a coupling member in the form of a standard accessory shoe. The flash unit comprises a housing provided with a foot or an analogous coupling member which can be slipped into an accessory shoe, and a plurality of sockets rotatably mounted in the housing and each arranged to carry and to transmit rotary motion to a "Flashcube" or an analogous multiple flash bulb container. The housing preferably carries two coaxial sockets and the flash unit preferably comprises manually operated common drive means for the two coaxial sockets. Such drive means may comprise a driving member in the form of a wheel a portion of which extends from the housing so that it may be engaged and rotated by hand, and a slip clutch interposed between the driving member and at least one of the coaxial sockets. The housing can also accommodate suitable detent means for releasably locating each socket in a plurality of preferably equidistant angular positions to insure that one flash bulb of the associated container is held in desired position with reference to the subject, for example, in a position insuring full or partial illumination.

In accordance with another advantageous feature of our invention, the housing of the flash unit preferably accommodates or carries a blocking member which can hold one or more sockets against rotation in response to operation of the drive means, and such blocking member may simultaneously serve as a control means for the flash circuit and is movable by a slide between three different positions in which the control circuit includes one flash bulb each of several containers, one flash bulb of a first container, or one flash bulb of a second container. In this way, the operator can set the flash unit for furnishing very strong artificial light or artificial light supplied by a single flash bulb in a selected container.

The novel features which are considered as characteristic of the invention are set forth in particular in the appended claims. The improved flash unit itself, however, both as to its construction and its mode of operation, together with additional features and advantages thereof, will be best understood upon perusal of the following detailed description of certain specific embodiments with reference to the accompanying drawings, in which:

FIG. 3 is a fragmentary vertical section as seen in the direction of arrows from the line III—III of FIG. 2;

FIG. 4 is another fragmentary vertical section as seen in the direction of arrows from the line IV—IV of FIG. 2;

FIG. 5 is a fragmentary side elevational view as seen in the direction of the arrow V shown in FIG. 2; and FIG. 6 illustrates the circuit of the flash unit.

Figure 1:
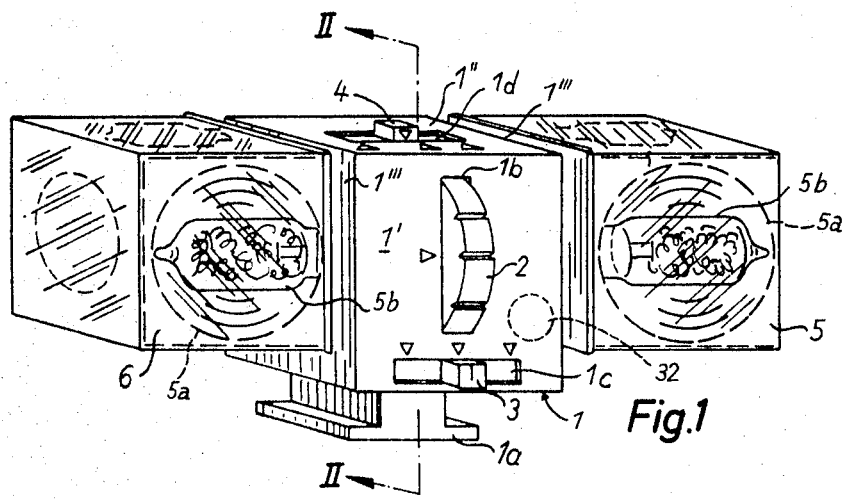
FIG. 1 is a perspective view of a flash unit which embodies our invention.
Figure 2:
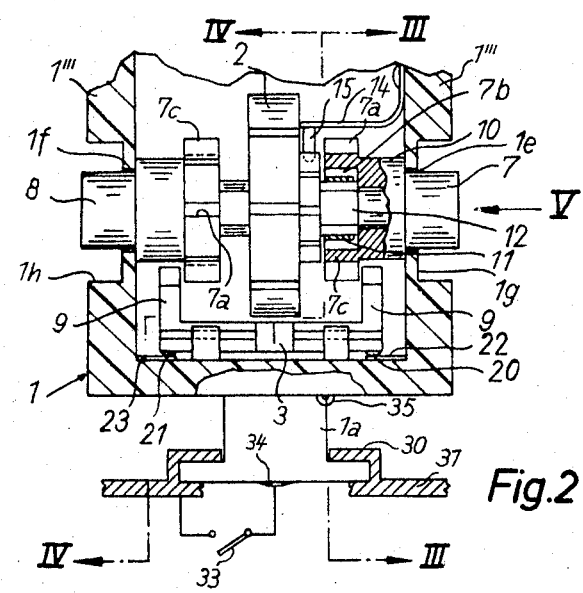
FIG. 2 is a fragmentary vertical section through the housing of the flash unit, substantially as seen in the direction of arrows from the line II—II of FIG. 1 and with the flash bulb containers omitted.

Referring to the drawings in detail, and first to FIGS. 1 and 2, there is shown a flash unit which comprises a housing 1 resembling a cube and connected with a male coupling member in the form of a standard foot 1a which can be introduced into and withdrawn from the space defined by a female coupling member in the form of a standard shoe 30 provided on the top wall 31 of a photographic camera. One side panel 1' of the housing 1 is provided with two recesses or windows 1b, 1c and a third window 1d is provided in the top panel 1''. The window 1b accommodates a portion of a driving member here shown as a wheel 2 which can be rotated by hand and serves to transmit rotary motion to one or both coaxial female coupling members or sockets 7, 8 best shown in FIG. 2. The common axis of the sockets 7, 8 is normal to the side panels 1''' of the housing 1. The window 1c accommodates a first slide 3 forming part of a blocking or arresting member 9, and the window 1d accommodates a portion of a second slide 4 which constitutes a control member.

The housing 1 can support two multiple flash bulb containers 5, 6 each of which is shown in the form of a so-called "Flashcube" having a total of four reflectors 5a located behind flash bulbs 5b. The plugs of the containers 5 and 6 are not shown in the drawings. Each such plug is insertable into and is then compelled to rotate with one of the sockets 7, 8 in a manner as disclosed, for example, in the copending application Ser. No. 550,805 of Wick et al.

FIG. 5 shows that the exposed end face of the socket 7 is formed with a cruciform recess 7d which receives a complementary projection of the plug on the container 5 and thereby prevents relative angular displacement between the plug and this socket. The sockets 7 and 8 respectively extend through aperatures 1e, 1f provided in the corresponding side panels 1''' of the housing 1, the apertures 1e and 1f being readily observable in FIG. 2 of the drawings.

FIG. 3 shows that the socket 7 comprises a relatively large disk-shaped extension 7c whose peripheral surface is provided with equidistant cutouts or slots 7a, there being a total of eight slots 7a one of which normally registers with one prong of the aforementioned blocking or arresting member 9. The extension 7c is further provided with a relatively large centrally located bore or hole 7b and is connected with two parallel leaf springs 10, 11 which extend across the bore 7b at the opposite sides of an octagonal cam 12 rigid with the wheel 2. The distance between the leaf springs 10, 11 is such that they can simultaneously engage two parallel facets of the cam 12 in a manner as shown in FIG. 3, but each of these springs can yield when the blocking member 9 holds the disk 7c against rotation with the wheel 2. The springs 10, 11 and the cam 12 together form a slip clutch which can rotate the socket 7 with the wheel 2 when the extension 7c is not engaged by the blocking member 9 but which allows the wheel 2 to rotate with reference to the socket 7 when the latter's extension 7c is held against rotation in response to shifting of the slide 3 to the left-hand end position, i.e., to the left of the central position shown in FIG. 1 or 2. The operator can feel how the resistance of the springs 10, 11 first increases and thereupon decreases while the wheel 2 is being rotated through an angle of 45 degrees, either in a clockwise or in a counterclockwise direction. As a matter of fact, the springs 10, 11 can automatically index the wheel 2 and the socket 7 to a new angular position as soon as the operator rotates the wheel 2 and the cam 12 through an angle of slightly more than 22.5 degrees so that the cam 12 is moved beyond a dead-center position. The clutch which connects the drive wheel 2 with the second socket 8 is identical with the clutch 10–12.

The flash unit of our invention is further provided with one or more detent devices two of which are illustrated in FIG. 4. However, it is clear that each such detent device can be used independently of the other. The first detent device comprises a disk 13 which is rigid with the wheel 2 and whose peripheral surface is provided with eight equidistant triangular notches or recesses 13a. One of these notches 13a normally receives the tip of a detent pin 15 which is biased by a leaf spring 14 to thereby tend to hold the wheel 2 in an angular position in which one of the flash bulbs 5b in the container which is coupled to the corresponding cam 12 either faces the subject or is inclined through 45 degrees with reference to such subject. This enables the operator to place the one or both containers 5, 6 in such angular position that the axes of two reflectors 5a are either parallel with the optical axis of the camera or make therewith angles of 45 degrees. In other words, the operator can decide upon full or partial illumination of the subject, either by a single flash bulb 5b or by two flash bulbs at a time. The provision of the detent device 13–15 is of importance when the sockets 7, 8 are not arrested by the blocking member 9 and are free to rotate with the wheel 2 because the leaf springs 10, 11 then cannot indicate when the wheel 2 has been turned through 45 degrees or through an angle which is a whole multiple of 45 degrees. In the central position shown in FIG. 2, the blocking member 9 is disengaged from both extensions 7c so that the sockets 7 and 8 can rotate with the drive wheel 2. If the slide 3 is shifted to the left, as viewed in FIG. 2, the blocking member 9 will engage and arrest only the extension 7c of the right-hand socket 7. If moved to the right, the slide 3 will cause the blocking member 9 to hold the socket 8 against rotation with the wheel 2.

The second detent device comprises a leaf spring 16 which is secured to the housing 1 and whose pallet can enter successive notches 2a provided in the periphery of the drive wheel 2. As stated hereinabove, one of the two detent devices may be dispensed with. In the illustrated embodiment, the provision of the detent device 13–15 constitutes a safety measure because the device including the leaf spring 16 by itself suffices to indicate to the operator when the two cams 12 are turned through 45 degrees or through a whole multiple of 45 degrees.

The slide 4 serves as a control means for selectively connecting into the flash circuit a single flash bulb 5b of the container 5, a single flash bulb of the container 6, or one flash bulb of each of these containers. The flash circuit (shown in FIG. 6) includes elastic contacts 17, 18, 19 which are also shown in FIG. 5 and are accommodated in a circular chamber 1g of the housing 1. This chamber 1g receives the base of the container 5 together with pairs of contacts which are provided on such base for each of the flash bulbs 5b. The manner in which the pairs of contacts are distributed on the base of the container 5 is fully disclosed in the aforementioned copending application Ser. No. 550,805. The contacts 17 and 19 are connected with one pole of a source of electrical energy here shown as a battery 32 which is preferably accommodated in the interior of the housing 1, see FIG. 1. The other pole of this battery is connectable with the contact 18 through the intermediary of a synchronizing switch 33 which is installed in the casing including the top wall 31 and closes automatically when the operator actuates the trigger to make an exposure with flash. The contacts 17, 19 are necessary to insure that the circuit of a flash bulb in the container 5 can be completed in the angular position which the container 5 assumes in FIG. 1 or in each angular position which this container assumes when the drive wheel 2 is rotated through 45 degrees or through a whole multiple of 45 degrees. The contacts in the chamber 1h are distributed in the same way as the contacts 17–19.

The slide 4 will be moved to the central position of FIG. 1 when the operator desires to simultaneously connect two flash bulbs 5b into the flash circuit so as to make an exposure in strong artificial light. By moving the slide 4 to the right-hand or to the left-hand end position, the operator disconnects one of the containers 5, 6 from the flash circuit so that, when making an exposure with flash, only one flash bulb 5b will furnish artificial light. This slide 4 can be omitted if the blocking member 9 is provided with two contacts 20, 21 which are shown in FIG. 2 and can be moved into current conducting engagement with one or both stationary contacts 22, 23 provided in the housing 1. In the central position of FIG. 2, the blocking member 9 maintains the contacts 20, 21 in engagement with the contacts 22, 23 so that the camera is ready to make an exposure with flash whereby one flash bulb 5b of each of the containers 5, 6 will furnish artificial light. By moving the blocking member 9 to the left-hand end position, the operator will disengage the contact 20 from the contact 22. The contact 21 will be disengaged from the contact 23 when the blocking member 9 is moved to the right-hand end position. It will be seen that the member 9 can perform the dual function of blocking rotation of one or both containers 5, 6 and of controlling the number of flash bulbs 5b which are connected in the flash circuit during a given exposure with flash.

The numeral 35 denotes in FIG. 2 a hinge which is preferably provided to allow for pivotal movement of the housing 1 with reference to the foot 1a. The axis of the hinge may be parallel or normal to the optical axis. By tilting the housing 1, the user of the camera can produce special illuminating effects.

The operation of the flash unit is as follows:

In order to attach the housing 1 to the top wall 31 of the camera, the operator slips the foot 1a into the shoe 30 whereby the customary centrally located contact element 34 of the socket 30 engages the corresponding contact of the foot 1a to connect the contacts 22, 23 with one terminal of the synchronizer switch 33. In the absence of the central contact 34, the flash unit must be connected with the camera by means of a customary cord, not shown. Depending on the desired illumination of the subject, the slide 4 is moved to one of its three positions in order to connect one or two flash bulbs 5b into the flash circuit. In the absence of the slide 4, the selection of one or two flash bulbs 5b is carried out by the slide 3 through the contact 20 and/or 21. The wheel 2 is then rotated in order to place one or two bulbs 5b into desired position with reference to the subject, i.e., either into a position in which the axis of the corresponding reflector 5a makes with the optical axis an angle of 45 degrees or in which the axis of the corresponding reflector is parallel with such optical axis. It is clear that the wheel 2 can also assume a position in which the axes of two reflectors 5a make with the optical axis an angle other than 45 degrees. Additional adjustments in lighting conditions can be made by pivoting the housing 1 about the hinge 35.

The completion of the flash circuit takes place in automatic response to operation of the trigger for the shutter mechanism in a manner well known from conventional cameras. The operator thereupon simply rotates the wheel 2 through an angle of 45 degrees or through a multiple of 45 degrees so as to place one or two fresh flash bulbs 5b into optimum position with reference to the subject. The blocking member 9 automatically holds an unexpended flash bulb 5b in requisite position by holding the socket 7 or 8 against rotation with the wheel 2. In other words, if the blocking member 9 engages one of the extensions 7c so that the exposure is made in light furnished by a single flash bulb, the bulbs of the container 5 are not rotated in response to rotation of the wheel 2 because such rotation of the container 5 is not necessary.

Instead of necessitating rotation of the wheel 2 directly by hand, the flash unit may comprise a plunger or another auxiliary device for effecting indirect rotation of the wheel 2. Alternatively, the sockets 7, 8 may be rotated by means of a drive which is mounted in or on the camera and which can include the film transporting unit so that the socket 7 and/or 8 is rotated in automatic response to lengthwise movement of the film by the length of a frame.

It is further to be noted that the container 5 or 6 can be rotated by hand because the clutches 10–12 allow for relative displacement of the container 5 with reference to the container 6 or vice versa. Such manual turning of one of the containers 5, 6 with reference to the other container can be carried out regardless of whether the housing 1 is attached to or detached from the shoe 30, and through an angle of any desired magnitude.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is:

1. A flash unit for use with photographic cameras, comprising a housing provided with a coupling member engageable by a complementary coupling member of a camera, said housing having a side panel; socket means including at least one socket supported by said housing for rotation about an axis which is substantially normal to said side panel, said socket being arranged to carry and to transmit rotary motion to a multiple flash bulb container and being rotatable between a plurality of angular positions whose number exceeds the number of flash bulbs in the container; and a flash circuit including a source of electrical energy and contacts provided on said housing and arranged to connect said source with a flash bulb of the container which is carried by said socket in several neighboring angular positions of said socket to fire such flash bulb in each of said neighboring angular positions in response to completion of said flash circuit to thus effect direct or indirect illumination of a subject.

2. A flash unit as defined in claim 1, wherein said socket means includes two coaxial sockets and wherein said housing further comprises a second side panel, each of said two coaxial sockets extending through one of said panels and the common axis of said sockets being normal to said panels.

3. A flash unit as set forth in claim 1 for use with containers having four flash bulbs each, wherein said socket is rotatable between eight equidistant positions.

4. A flash unit as set forth in claim 1, further comprising adjusting means pivotally connecting said first named coupling member with said housing.

5. A flash unit as defined in claim 1, wherein said socket means includes a plurality of sockets each arranged to carry and to transmit rotary motion to a separate multiple flash bulb container.

6. A flash unit as set forth in claim 5, wherein each of said sockets is rotatable between a plurality of angular positions and further comprising detent means for releasably locating said sockets in each of their angular positions.

7. A flash unit as set forth in claim 5, further comprising a flash circuit and control means for selectively connecting flash bulbs of the containers carried by said sockets into said flash circuit.

8. A flash unit as set forth in claim 7, wherein said sockets include two coaxial sockets and said control means comprises a slide movable between three positions in which said control means respectively connects into said circuit a flash bulb of each of the containers carried by said coaxial sockets, a flash bulb of one of such containers, and a flash bulb of the other container.

9. A flash unit as set forth in claim 5, further comprising common drive means for rotating said sockets together with the containers connected with such sockets.

10. A flash unit as set forth in claim 9, wherein said sockets include a pair of coaxial sockets and said drive means includes a rotary driving member and a slip clutch interposed between said driving member and each of said coaxial sockets.

11. A flash unit as set forth in claim 9, wherein said drive means comprises a driving member and at least one slip clutch connecting said driving member with one of said sockets.

12. A flash unit as set forth in claim 11, further comprising blocking means movable away from and into engagement with said one socket to thereby hold the latter against rotation by said slip clutch.

13. A flash unit for use with photographic cameras, comprising a housing provided with a coupling member engageable by a complementary coupling member of a camera; a plurality of sockets rotatably supported by said housing and each arranged to carry and to transmit rotary motion to a multiple flash bulb container, said sockets including a pair of coaxial sockets; and common drive means for rotating said sockets together with the containers connected with such sockets, said drive means including a rotary driving member and a slip clutch interposed between said driving member and each of said coaxial sockets, each of said slip clutches comprising a polygonal cam rotatable with said driving member and resilient means provided on the respective socket and engaging said cam so as to normally transmit rotary motion from the cam to the respective socket.

14. A flash unit as set forth in claim 13, wherein each of said cams is of octagonal outline and each of said resilient means comprises a pair of substantially parallel leaf springs anchored in the respective socket and engaging two parallel facets of the associated cam.

15. A flash unit as set forth in claim 13, further comprising blocking means movable away from and into arresting engagement with said sockets to respectively release and hold said sockets against rotation with the associated cams.

16. A flash unit for use with photographic cameras, comprising a housing provided with a coupling member engageable by a complementary coupling member of a camera; a plurality of sockets rotatably supported by said housing and each arranged to carry and to transmit rotary motion to a multiple flash bulb container, said sockets including two coaxial sockets; and common drive means for rotating said sockets, said drive means comprising a wheel coaxial with said two sockets and having a manually engageable portion extending from said housing, and a slip clutch provided between said wheel and each of said two sockets.

17. A flash unit as set forth in claim 16, further comprising resilient detent means for releasably locating each of said two sockets in a plurality of equidistant angular positions.

References Cited

UNITED STATES PATENTS

| | | | |
|---|---|---|---|
| 2,032,515 | 3/1936 | Troup | 240—37.1 |
| 2,485,403 | 10/1949 | Noel et al. | 95—11.5 XR |
| 2,557,531 | 6/1951 | Blanchet | 240—37.1 XR |
| 2,622,188 | 12/1952 | Seeger et al. | 95—11.5 XR |
| 2,697,390 | 12/1954 | Kindelberger | 95—11 |
| 2,898,447 | 8/1959 | Hanlon | 240—1.3 |
| 3,222,513 | 12/1965 | De Feo | 240—37.1 |
| 3,335,651 | 8/1967 | Williams et al. | 240—1.3 XR |

NORTON ANSHER, Primary Examiner.

FRED L. BRAUN, Assistant Examiner.

U.S. Cl. X.R.

95—11.5